(12) United States Patent
Kimura

(10) Patent No.: US 8,277,873 B2
(45) Date of Patent: Oct. 2, 2012

(54) METHOD FOR MANUFACTURING HYDROGEN SEPARATION MEMBRANE FUEL CELL

(75) Inventor: Kenji Kimura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 655 days.

(21) Appl. No.: 12/375,274

(22) PCT Filed: Jul. 25, 2007

(86) PCT No.: PCT/IB2007/002109
§ 371 (c)(1),
(2), (4) Date: Jan. 27, 2009

(87) PCT Pub. No.: WO2008/012648
PCT Pub. Date: Jan. 31, 2008

(65) Prior Publication Data
US 2010/0021628 A1  Jan. 28, 2010

(30) Foreign Application Priority Data
Jul. 28, 2006 (JP) .................................. 2006-206174

(51) Int. Cl.
*B05D 5/12* (2006.01)
(52) U.S. Cl. ........ 427/115; 429/452; 429/457; 429/479; 429/535
(58) Field of Classification Search .................. 427/115; 429/452, 457, 479, 535
See application file for complete search history.

(56) References Cited

U.S. PATENT DOCUMENTS

| 4,352,865 A | 10/1982 | DiPasquale | |
|---|---|---|---|
| 2002/0081480 A1* | 6/2002 | Inoue et al. | 429/36 |
| 2004/0131908 A1 | 7/2004 | Tanaka | |
| 2005/0249997 A1* | 11/2005 | Tomimatsu et al. | 429/35 |
| 2005/0255362 A1* | 11/2005 | Miyazawa | 429/35 |
| 2006/0115710 A1 | 6/2006 | Kusakabe et al. | |

FOREIGN PATENT DOCUMENTS

| EP | 1 619 736 A1 | 1/2006 |
|---|---|---|
| JP | 5-166523 | 7/1993 |
| JP | 2004-111145 | 4/2004 |
| JP | 2005-166531 | 6/2005 |
| JP | 2005-203283 | 7/2005 |
| JP | 2006-12467 | 1/2006 |
| WO | WO 2004/084333 | 9/2004 |

OTHER PUBLICATIONS

Notification of Reason(s) for Refusal for JP Appl. No. 2006-206174 dated May 21, 2012.

* cited by examiner

*Primary Examiner* — Philip Tucker
*Assistant Examiner* — Nickolas Harm
(74) *Attorney, Agent, or Firm* — Finnegan, Henderson, Farabow, Garrett & Dunner, LLP

(57) ABSTRACT

There is provided a method for manufacturing a fuel cell, such as a hydrogen separation membrane fuel cell, having in its anode a hydrogen separation membrane (12f) selectively permeable by hydrogen. An electrolyte membrane (10) is formed on the hydrogen separation membrane, and the curvature of the electrolyte membrane is changed to generate a compressive stress in the electrolyte membrane.

5 Claims, 8 Drawing Sheets

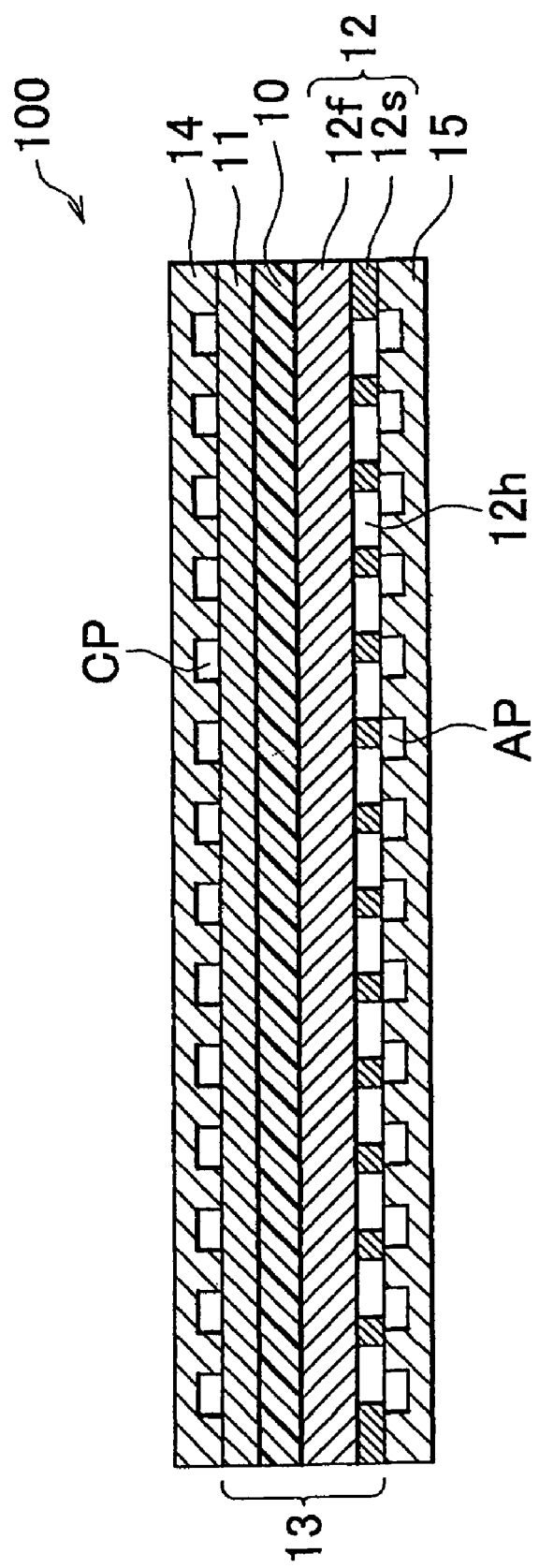

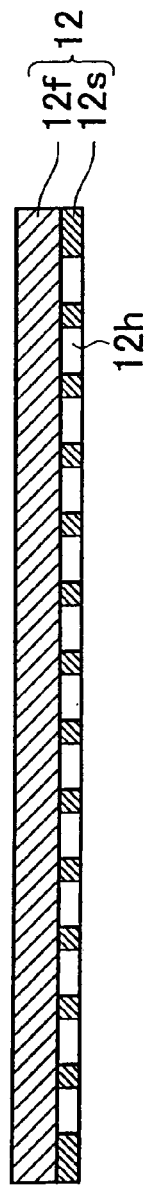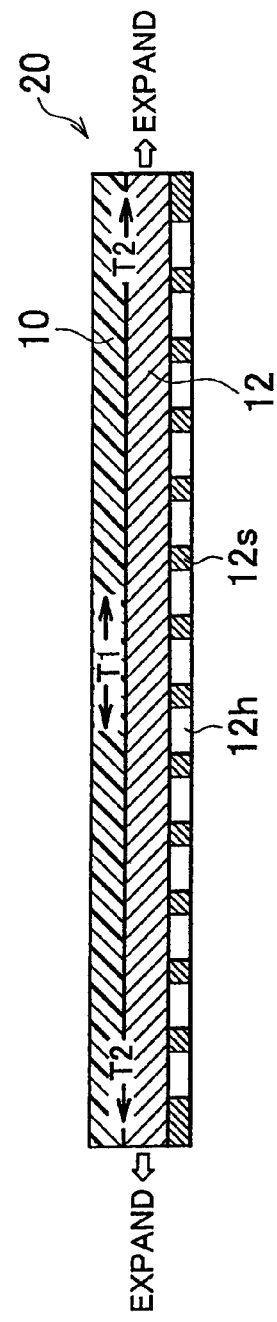
FIG.2A
FIG.2B

METHOD FOR MANUFACTURING HYDROGEN SEPARATION MEMBRANE FUEL CELL

CROSS-REFERENCE TO RELATED APPLICATIONS

This application is a national phase application of International Application No. PCT/IB2007/002109, filed Jul. 25, 2007, and claims the priority of Japanese Application No. 2006-206174, filed Jul. 28, 2006, the contents of both of which are incorporated herein by reference.

BACKGROUND OF THE INVENTION

1. Field of the Invention

The present invention relates to a method for manufacturing a hydrogen separation membrane fuel cell.

2. Description of the Related Art

Some fuel cells, known as hydrogen separation membrane fuel cells, have in their anode layer a hydrogen separation membrane selectively permeable by hydrogen, and thus supply only hydrogen from hydrogen-containing gas to an electrolyte. For example, Japanese Patent Application Publication No. 2006-12467 describes a method for manufacturing a hydrogen separation membrane fuel cell in which an electrolyte membrane is formed on a surface of a hydrogen separation membrane base.

In general, an electrolyte membrane is formed at high temperature. Thus, if an electrolyte membrane is left at low temperatures after being formed, an internal stress (tensile stress) may be generated in the electrolyte membrane due to shrinkage of its crystal. In addition, the thermal expansion coefficient of a hydrogen separation membrane base is often higher than that of an electrolyte membrane. It is thus known that the hydrogen separation membrane expands in a direction generally perpendicular to the moving direction of hydrogen during use of the fuel cell. Thus, an electrolyte membrane formed on a hydrogen separation membrane tends to be subjected to a tensile stress generated at an interface with the hydrogen separation membrane base during use of the fuel cell.

If such internal stresses become larger than the strength of the electrolyte membrane or the bonding strength with the hydrogen separation membrane, the electrolyte membrane may crack to cause short-circuiting between electrodes, or the electrolyte membrane may be otherwise damaged, for example with the hydrogen separation membrane peeled off from the electrolyte membrane.

SUMMARY OF THE INVENTION

The present invention provides a technique to reduce the possibility of damaging an electrolyte membrane of a hydrogen separation membrane fuel cell.

One aspect of the present invention provides a method for manufacturing a fuel cell, including: forming an electrolyte membrane on a hydrogen separation membrane permeable by hydrogen to form an assembly; and changing the curvature of the electrolyte membrane of the assembly to generate a compressive stress in the electrolyte membrane.

According to this aspect, even if an internal stress (tensile stress) is generated in the electrolyte membrane, the compressive stress generated during the manufacturing process absorbs or reduces the tensile stress, reducing the possibility of damage to the electrolyte membrane due to an increase in the tensile stress.

Before forming the assembly, the hydrogen separation membrane may be provided with a support member for supporting the hydrogen separation membrane.

According to this method, the strength of the hydrogen separation membrane is improved by the support member, facilitating and ensuring subsequent processes such as deforming.

The assembly may be curved such that its surface where the electrolyte membrane is formed is concavely curved.

According to this method, a compressive stress along the concave surface is generated in the electrolyte membrane, reducing the opposing tensile stress in the electrolyte membrane and hence the possibility of damage to the electrolyte membrane.

A surface of the assembly where the electrolyte membrane is formed may be deformed from a convex shape to a flat shape.

According to this method, in the case where the hydrogen separation membrane is curved such that its surface where an electrolyte membrane is to be formed is convex and then an electrolyte membrane is formed on the hydrogen separation membrane, a compressive stress is generated in the electrolyte membrane by deforming the curved surface into a flat surface. Thus, the possibility of damage to the electrolyte membrane due to the tensile stress therein reduces.

The electrolyte membrane may be formed by growing columnar crystal on a surface of the hydrogen separation membrane.

According to this method, due to the crystal structure of the columnar crystal, the crystal of the electrolyte membrane receives a stress in a direction generally perpendicular to the longitudinal direction of the columnar crystal. Thus, the tensile stress and hence the possibility of damage to the electrolyte membrane is further reduced.

The present invention can be implemented in various forms, such as a hydrogen separation membrane fuel cell, a fuel cell system including the hydrogen separation membrane fuel cell, and a vehicle incorporating the fuel cell system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a schematic cross sectional view showing an example of the construction of a hydrogen separation membrane fuel cell;

FIGS. 2A and 2B illustrate a process for manufacturing a hydrogen separation membrane fuel cell according to a first embodiment;

DETAILED DESCRIPTION OF THE EXAMPLE EMBODIMENTS

Figure 3A:
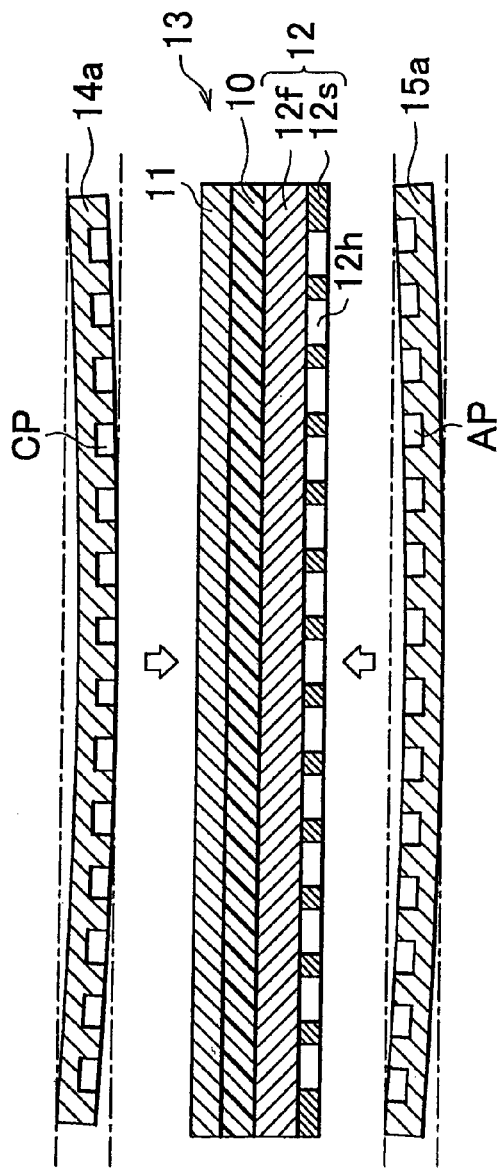
FIGS. 3A and 3B illustrate the process for manufacturing a hydrogen separation membrane fuel cell according to the first embodiment.

FIG. 1 is a schematic cross sectional view showing an example of the construction of a hydrogen separation membrane fuel cell. A unit cell of a hydrogen separation membrane fuel cell 100 includes a membrane electrode assembly 13 and separators 14 and 15 interposing the assembly 13 therebetween. The membrane electrode assembly 13 includes an electrolyte membrane 10, and a cathode layer 11 and a hydrogen separation anode layer 12 interposing the membrane 10 therebetween. In general, a plurality of such unit cells are stacked together to constitute a hydrogen separation membrane fuel cell stack.

The electrolyte membrane 10 is a thin film with good proton conductivity in wet conditions. Examples of the material of the electrolyte membrane 10 include ceramic proton conductors of "$BaCeO_3$" and "$SrCeO_3$" systems. The cathode layer 11 is a membrane formed of a metal or ceramic material on the electrolyte membrane 10. An example of the material of the cathode layer 11 includes palladium (Pd). The cathode layer 11 may be provided with an electrode catalyst layer carrying platinum (Pt) or the like.

The hydrogen separation anode layer 12 is made up of a hydrogen separation membrane 12f and a support member 12s. The hydrogen separation membrane 12f is formed of Pd or a Pd alloy, for example, and selectively permeable by hydrogen. The hydrogen separation membrane 12f also functions as an anode. The support member 12s has the shape of a plate formed with a plurality of through holes 12h which allow passage of supplied hydrogen-containing gas, and is made of a stainless steel (SUS), for example.

The cathode separator 14 is disposed in contact with the cathode layer 11. A surface of the cathode separator 14 on the cathode layer 11 side is formed with a plurality of grooves (cathode gas flow paths CP) for supplying oxygen-containing gas to the cathode layer 11. The anode separator 15 is disposed in contact with the support member 12s of the hydrogen separation anode layer 12. A surface of the anode separator 15 on the support member 12s side is formed with a plurality of grooves (anode gas flow paths AP) for supplying hydrogen-containing gas to the hydrogen separation membrane 12f.

The two separators 14 and 15 have a function of collecting electricity generated in an electrochemical reaction between hydrogen and oxygen in the hydrogen separation membrane fuel cell 100. The two separators 14 and 15 are formed of a conductive material such as carbon and metal, for example.

FIGS. 2A, 2B, 3A, and 3B illustrate a process for manufacturing a membrane electrode assembly for use in a hydrogen separation membrane fuel cell according to a first embodiment of the present invention. The construction and materials of the hydrogen separation membrane fuel cell are approximately the same as those of the hydrogen separation membrane fuel cell 100 discussed above, and differences between them will hereinafter be described.

FIG. 2A is a schematic cross sectional view showing a hydrogen separation anode layer 12. In the process of FIG. 2A, a hydrogen separation membrane 12f is prepared first. A support member 12s formed with a plurality of through holes 12h is disposed at one surface of the hydrogen separation membrane 12f. The hydrogen separation membrane 12f may be a self-supported membrane not provided with the support member 12s. Alternatively, the support member 12s may be provided to the hydrogen separation membrane 12f in a process subsequent to that of FIG. 2A.

In the process of FIG. 2B, an electrolyte membrane 10 is formed on an outer surface of the hydrogen separation membrane 12f not in contact with the support member 12s. Being formed on the hydrogen separation membrane 12f which is dense, the electrolyte membrane 10 is made thinner. As the electrolyte membrane 10 is thinner, the membrane resistance reduces. The hydrogen separation membrane 12f provided with the electrolyte membrane 10 (and not provided with a cathode layer) is referred to as "hydrogen separation membrane-electrolyte membrane assembly 20."

The electrolyte membrane 10 may be formed using a dry coating method such as PLD (pulsed laser deposition) or sputtering. The electrolyte membrane 10 may be formed as columnar crystal growing on a surface of the hydrogen separation membrane 12f.

In such a membrane formation process, the electrolyte membrane 10 and the hydrogen separation membrane 12f can be subjected to significantly high temperatures. For example, when the membrane is formed on palladium (Pd) using PLD, the temperature reaches about 600° C. Then, if the electrolyte membrane 10 and the hydrogen separation membrane 12f are left at low temperatures after the electrolyte membrane 10 is formed, an internal stress (tensile stress) T1 may be generated in the electrolyte membrane 10 due to shrinkage of its crystal.

In general, a material for forming the hydrogen separation membrane 12f is large in thermal expansion coefficient, compared to that for the electrolyte membrane 10. In addition, the hydrogen separation membrane 12f is known to expand in a direction generally perpendicular to the permeating direction of hydrogen as hydrogen permeates under high-temperature operating conditions from 400° C. to 500° C. Thus, a tensile stress T2 may be generated at an interface of the electrolyte membrane 10 with the hydrogen separation membrane 12f.

Thus, if a hydrogen separation membrane fuel cell is assembled without taking any measures, the electrolyte membrane 10 may crack to cause short-circuiting between electrodes, or the hydrogen separation membrane 12f may be peeled off from the electrolyte membrane 10, in the case where the stresses T1 and T2 discussed above increase. Therefore, the following processes are provided in this embodiment.

In the process of FIG. 3A, a cathode layer 11 is provided to the hydrogen separation membrane-electrolyte membrane assembly 20 to obtain a membrane electrode assembly 13. In addition, two separators 14a and 15a to hold the membrane electrode assembly 13 therebetween are prepared.

The cathode separator 14a is generally in the shape of a curved plate with its surface where the cathode gas flow paths CP are formed convexly curved. The anode separator 15a is generally in the shape of a curved plate with its surface where the anode gas flow paths AP are formed to be concavely curved at about the same curvature as the cathode separator 14a.

Figure 3B:
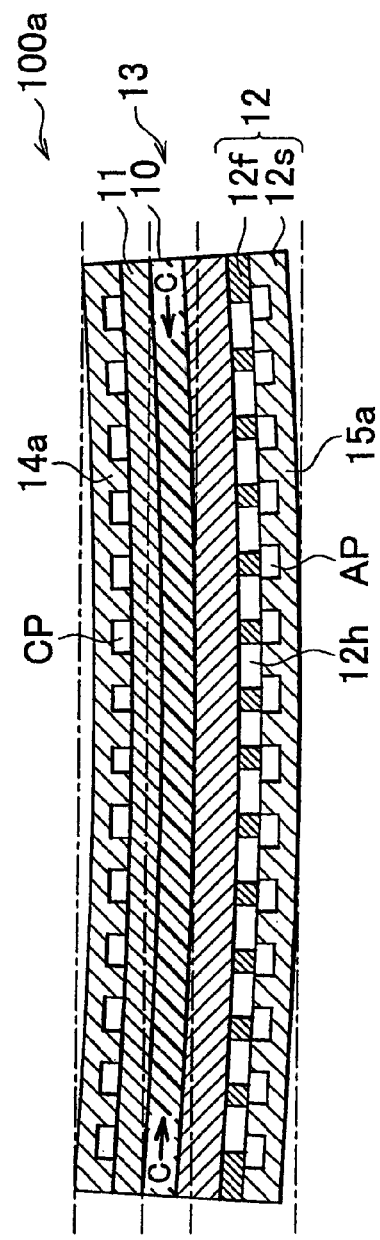

In the process of FIG. 3B, the two separators 14a and 15a holds the membrane electrode assembly 13 therebetween, whereby a hydrogen separation membrane fuel cell 100a is assembled. Thus, the membrane electrode assembly 13 is curved by the two separators 14a and 15a to form the shape of a curved plate with its surfaces on the hydrogen separation membrane 12f side and on the cathode layer 11 side convexly curved and concavely curved, respectively.

As a result, the electrolyte membrane 10 receives a compressive stress C toward the center of the curved surface (FIG. 3B; arrows C). Thus, the tensile stress T1 (FIG. 2B) due to shrinkage of crystal of the electrolyte membrane 10 and the tensile stress T2 (FIG. 2B) generated at an interface with the hydrogen separation membrane 12f discussed above are absorbed or reduced by the compressive stress C.

In the case where the electrolyte membrane 10 is formed as columnar crystal, the crystal receives a stress in a direction generally perpendicular to the longitudinal direction of the columnar crystal. Thus, the stress is reduced at the crystal level, providing a more drastic stress reducing effect. Please note that the electrolyte membrane 10 may not be formed as columnar crystal.

As described above, in the first embodiment, the electrolyte membrane 10 is formed on the flat hydrogen separation membrane 12f, and then the resulting assembly is curved such that its surface on the electrolyte membrane 10 side is concavely curved to assemble the fuel cell. Thus, the electrolyte membrane 10 receives a reduced stress as discussed above, reducing the possibility of damage to the electrolyte membrane 10.

FIGS. 4A, 4B, 5A, and 5B illustrate a process for manufacturing a membrane electrode assembly for use in a hydrogen separation membrane fuel cell according to a second embodiment of the present invention. The processes shown in FIGS. 4A, 4B, 5A, and 5B are approximately the same as those shown in FIGS. 2A, 2B, 3A, and 3B, except for the shape of a hydrogen separation anode layer 12a in FIG. 4A.

Figure 4A:
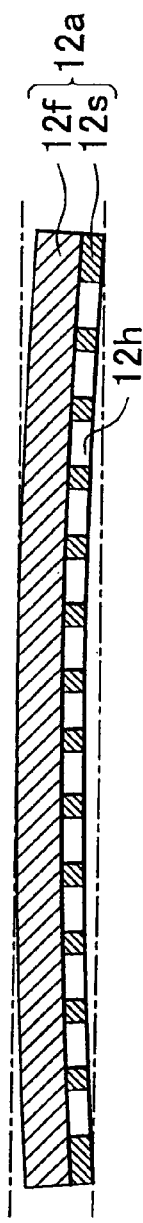
FIGS. 4A and 4B illustrate a process for manufacturing a hydrogen separation membrane fuel cell according to a second embodiment.

In the process of FIG. 4A, a hydrogen separation anode layer 12a is prepared (FIG. 4A). The hydrogen separation anode layer 12a in this embodiment generally has the shape of a curved plate with its surface where an electrolyte membrane 10 is to be formed convexly curved. The curvature may be about the same as that of the two separators 14a and 15a in the first embodiment.

Figure 4B:
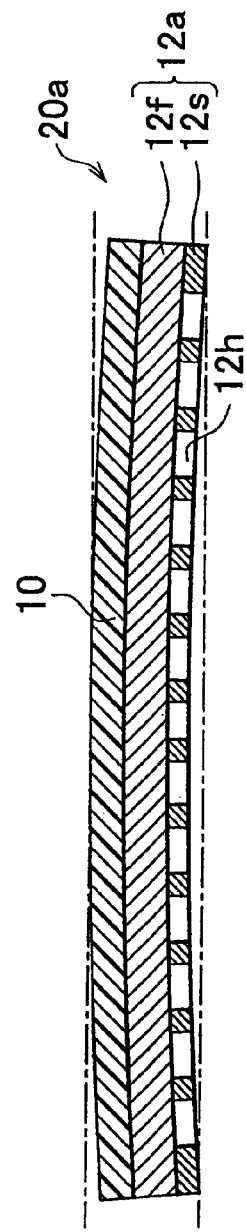

The process of FIG. 4B and subsequent processes are the same as those in the first embodiment. As the hydrogen separation anode layer 12a is curved as discussed above, the electrolyte membrane 10 is also curved (FIG. 4B; hydrogen separation membrane-electrolyte membrane assembly 20a). Naturally, a membrane electrode assembly 13a before being interposed between two separators 14a and 15a is generally formed in the shape of a curved plate with its surface on the cathode layer 11 side swelled.

Figure 5A:
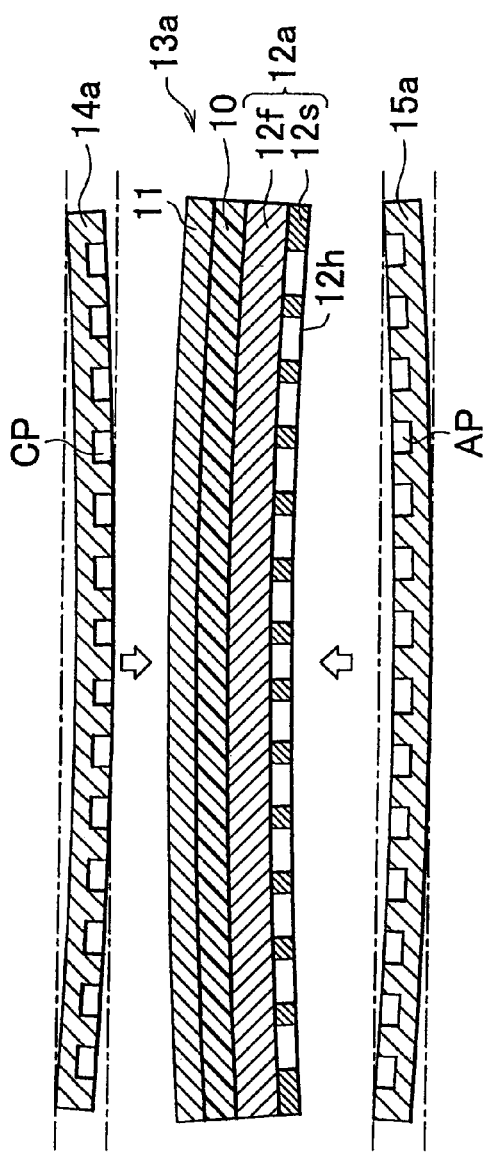
FIGS. 5A and 5B illustrate the process for manufacturing a hydrogen separation membrane fuel cell according to the second embodiment.
Figure 5B:
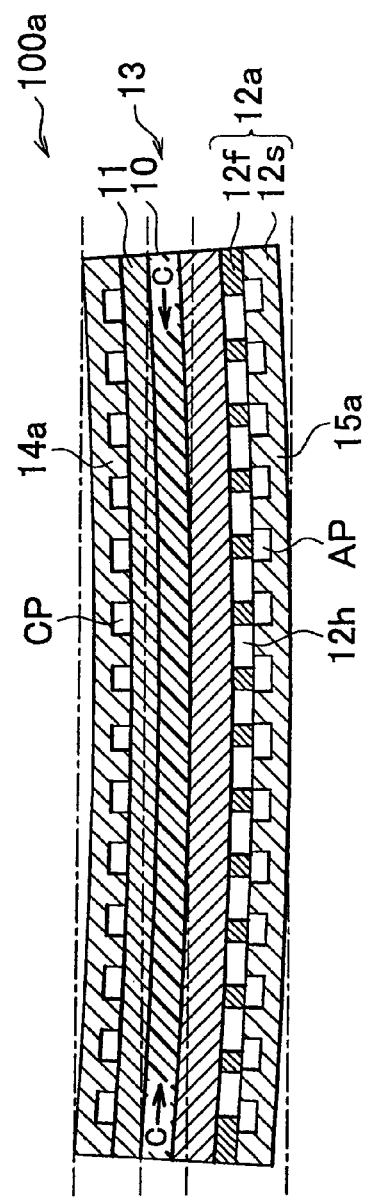

In the process of FIG. 5B, the membrane electrode assembly 13a is held between the two separators 14a and 15a, and thereby generally deformed into the shape of a curved plate with its surface on the electrolyte membrane 10 side concavely curved (FIG. 5).

According to this manufacturing method, a compressive stress C (FIG. 5B; arrows C) generated in the electrolyte membrane 10 of the hydrogen separation membrane fuel cell 100a is larger than that in the first embodiment, further reducing the possibility of damage to the electrolyte membrane 10.

Figure 6A:
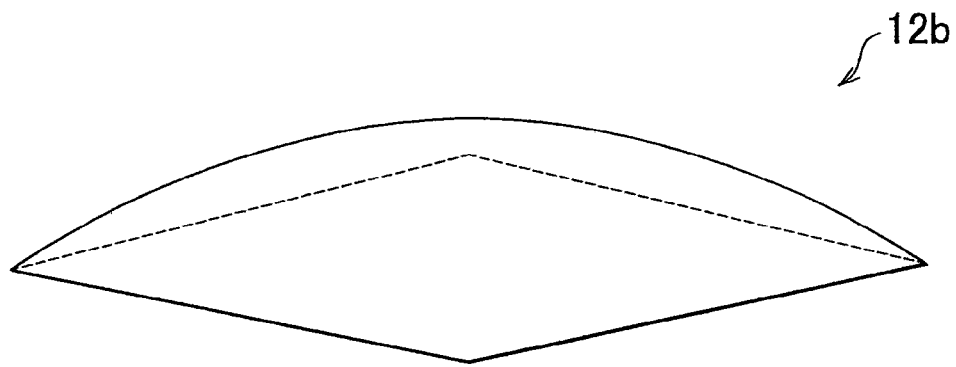
FIGS. 6A to 6C schematically illustrate a process for manufacturing a hydrogen separation membrane fuel cell according to a third embodiment.
Figure 6B:
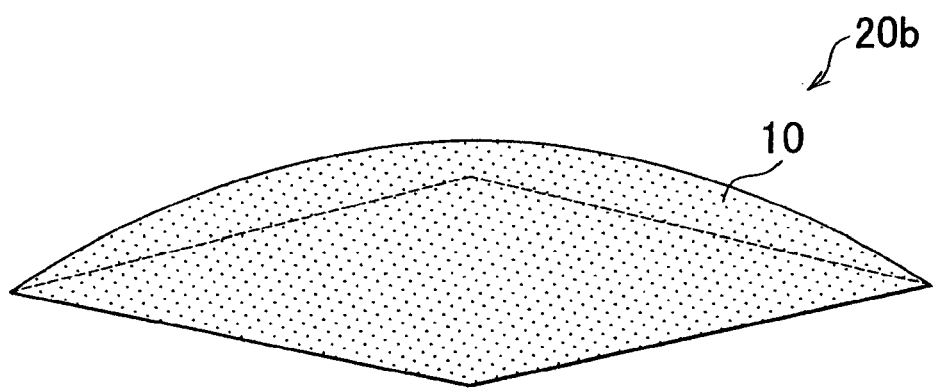
Figure 6C:
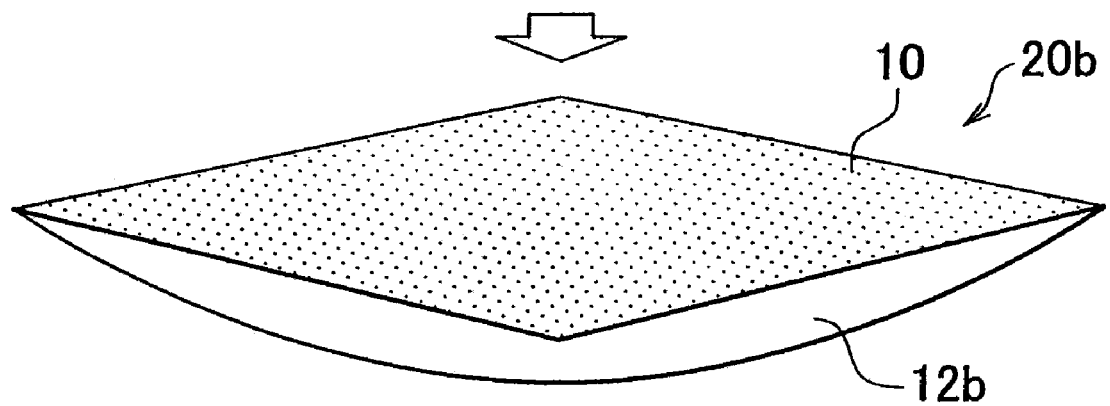

FIGS. 6A to 6C schematically illustrate a method for manufacturing a hydrogen separation membrane fuel cell according to a third embodiment.

FIG. 6A is a perspective view schematically showing a hydrogen separation anode layer 12b. Although the hydrogen separation anode layer 12a prepared in the process of FIG. 4A in the second embodiment is generally in the shape of a curved plate, the hydrogen separation anode layer 12b prepared in this embodiment is generally in the shape of a mortar (or a bowl) with the vicinity of the center of its surface where an electrolyte membrane 10 is to be formed swelled most. Although not shown, a support member 12s may be provided to the hydrogen separation membrane 12f of the hydrogen separation anode layer 12b.

In the process of FIG. 6B, an electrolyte membrane 10 is formed on a convex surface of the hydrogen separation membrane 12f to obtain a hydrogen separation membrane-electrolyte membrane assembly 20b. Then, in the process of FIG. 6C, the hydrogen separation anode layer 12b is deformed such that its surface on the electrolyte membrane 10 side is concavely curved.

Also in this embodiment, the hydrogen separation membrane-electrolyte membrane assembly 20b may be deformed using the same method as in the first and second embodiments. That is, after providing a cathode layer (not shown) to the electrolyte membrane 10, two separators generally in the shape of a mortar swelled in the direction opposite to the hydrogen separation anode layer 12b of FIG. 6A may be prepared and hold the assembly 20b therebetween.

According to this manufacturing method, the compressive stress generated in electrolyte membrane 10 acts from the entire outer edge toward the bottom of the generally mortar shape, reducing opposing tensile stresses acting in the electrolyte membrane 10. Thus, the possibility of damage to the electrolyte membrane 10 is reduced more than in the first and second embodiments.

Figure 7:
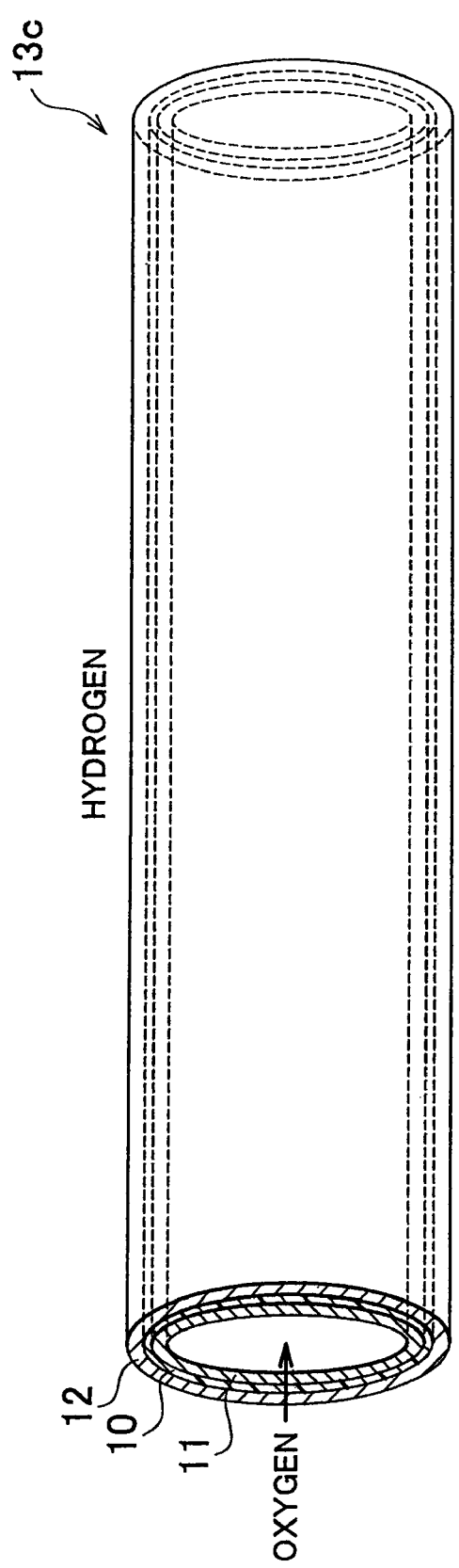
FIG. 7 is a schematic view showing a hydrogen separation membrane fuel cell according to a fourth embodiment.

FIG. 7 is a schematic view showing a membrane electrode assembly 13c for use in a cylindrical hydrogen separation membrane fuel cell. The membrane electrode assembly 13c is formed by, for example, deforming either one of the membrane electrode assemblies 13 and 13a shown in FIGS. 3A and 5A, respectively, into a cylindrical shape with the cathode layer 11 on the inner side, as shown in FIG. 7. Note that the support member 12s is not shown in FIG. 7.

In the electrolyte membrane 10 of the membrane electrode assembly 13c, a compressive stress in the direction of the circumference of the cylindrical shape is generated, reducing the possibility of damage to the electrolyte membrane 10.

In the above embodiments, the membrane electrode assembly 13 is deformed by being held between the two separators 14a and 15a. However, the membrane electrode assembly 13 may be deformed by applying a pressing force thereto, for example, before being held between the separators.

In the above embodiments, the curvature of the membrane electrode assembly is changed (FIGS. 3B and 5B) after forming the cathode layer 11. However, the curvature of the hydrogen separation membrane-electrolyte membrane assembly 20 or 20a may be changed before forming the cathode layer 11.

In the second embodiment, the membrane electrode assembly 13a is held between the two curved separators 14a and 15a. However, the assembly 13a may be held between ordinary flat separators 14 and 15 (in which case, the construction of a hydrogen separation membrane fuel cell after assembly is the same as that of FIG. 1). With this construction, the membrane electrode assembly 13a which has been curved is deformed into a flat shape by the separators 14 and 15, generating a compressive stress in the electrolyte membrane 10. Thus, the possibility of damage to the electrolyte membrane reduces.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:
1. A method for manufacturing a fuel cell, comprising:
forming an electrolyte membrane on a hydrogen separation membrane permeable by hydrogen to form an assembly; and changing the curvature of the electrolyte membrane of the assembly to generate a compressive stress in the electrolyte membrane by holding the assembly between curved separators, wherein in the assembly formed in said forming, a surface of the hydrogen separation membrane has a convex curvature, and wherein said changing the curvature of the electrolyte membrane comprises placing the assembly between the curved separators such that a convex-curved surface of one of the curved separators and said surface of the hydrogen separation membrane having a convex curvature face toward one another.

2. The method for manufacturing a fuel cell according to claim 1, further comprising:

providing, before forming the assembly, the hydrogen separation membrane with a support member for supporting the hydrogen separation membrane.

3. The method for manufacturing a fuel cell according to claim 1, wherein:

said changing the curvature of the electrolyte membrane comprises changing the curvature of the assembly such that a surface of the hydrogen separation membrane where the electrolyte membrane is formed is concavely curved.

4. The method for manufacturing a fuel cell according to claim 1, wherein the electrolyte membrane is formed by growing columnar crystal on a surface of the hydrogen separation membrane.

5. The method for manufacturing a fuel cell according to claim 1, further comprising:

providing a cathode layer on the electrolyte membrane.

* * * * *